(12) United States Patent
Nilsson et al.

(10) Patent No.: US 9,060,189 B2
(45) Date of Patent: Jun. 16, 2015

(54) MULTIPLEXED VIDEO STREAMING

(75) Inventors: Michael E Nilsson, Ipswich (GB); Ian B Crabtree, Ipswich (GB); Patrick J Mulroy, Vizcaya (ES)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 350 days.

(21) Appl. No.: 13/133,757

(22) PCT Filed: Dec. 7, 2009

(86) PCT No.: PCT/GB2009/002827
§ 371 (c)(1),
(2), (4) Date: Jun. 9, 2011

(87) PCT Pub. No.: WO2010/067050
PCT Pub. Date: Jun. 17, 2010

(65) Prior Publication Data
US 2011/0243223 A1 Oct. 6, 2011

(30) Foreign Application Priority Data
Dec. 10, 2008 (EP) .................................. 08253946

(51) Int. Cl.
*H04N 21/2365* (2011.01)
*H04N 19/149* (2014.01)
(Continued)

(52) U.S. Cl.
CPC .... *H04N 21/23655* (2013.01); *H04N 2007/243* (2013.01); *H04N 19/149* (2014.11);
(Continued)

(58) Field of Classification Search
CPC .................... H04N 19/00018; H04N 19/0006; H04N 19/00103; H04N 19/00169; H04N 19/00181; H04N 19/00193; H04N 19/00781; H04N 19/00818; H04N 2007/243; H04N 21/23655; H04N 7/26611; H04N 19/00; H04N 19/00096

USPC .......... 375/E7.103, E7.014, E7.134, E7.159, 375/E7.176, E7.181, E7.199, E7.216, 375/E7.222, E7.268, 240.03, 240.07; 370/537

See application file for complete search history.

(56) References Cited

U.S. PATENT DOCUMENTS

| 4,419,699 A | 12/1983 | Christopher et al. |
| 5,025,458 A | 6/1991 | Casper et al. |

(Continued)

FOREIGN PATENT DOCUMENTS

| CN | 1426235 | 6/2003 |
| CN | 1714577 A | 12/2005 |

(Continued)

OTHER PUBLICATIONS

International Search Report for PCT/GB2009/002827, mailed Apr. 9, 2010.

(Continued)

*Primary Examiner* — Sath V Perungavoor
*Assistant Examiner* — Dakshesh Parikh
(74) *Attorney, Agent, or Firm* — Nixon & Vanderhye PC (57) ABSTRACT

A plurality of video streams is transmitted over a transmission link. At intervals, one determines for each video stream at each of a plurality of encoder settings, having regard to the amount of data buffered at a receiver for that stream, a bit rate sufficient to transmit the remainder of that stream at that encoder setting such as to avoid buffer underflow at the receiver. One determines also a critical point equal to the earliest time at which that bit rate can be reduced while still avoiding buffer underflow at the receiver. An encoder setting is chosen for each video stream such that the sum of said bit rates required for transmission of the streams does not exceed the capacity of the transmission link. Any surplus capacity of the transmission link is allocated to the stream that has the earliest critical point.

6 Claims, 4 Drawing Sheets

(51) Int. Cl.
*H04N 19/103* (2014.01)
*H04N 19/127* (2014.01)
*H04N 19/152* (2014.01)
*H04N 7/24* (2011.01)
*H04N 19/63* (2014.01)
*H04N 19/115* (2014.01)
*H04N 19/61* (2014.01)
*H04N 19/146* (2014.01)

(52) U.S. Cl.
CPC .......... H04N 19/63 (2014.11); H04N 19/115 (2014.11); H04N 19/61 (2014.11); *H04N 19/103* (2014.11); *H04N 19/127* (2014.11); H04N 19/146 (2014.11); *H04N 19/152* (2014.11)

(56) References Cited

U.S. PATENT DOCUMENTS

| | | |
|---|---|---|
| 5,430,485 A | 7/1995 | Lankford et al. |
| 5,534,937 A | 7/1996 | Zhu et al. |
| 5,598,352 A | 1/1997 | Rosenau et al. |
| 5,612,900 A | 3/1997 | Azadegan et al. |
| 5,640,208 A | 6/1997 | Fujinami |
| 5,768,527 A | 6/1998 | Zhu et al. |
| 5,874,997 A | 2/1999 | Haigh |
| 5,923,655 A | 7/1999 | Veschi et al. |
| 5,949,410 A | 9/1999 | Fun |
| 5,953,350 A | 9/1999 | Higgins |
| 5,991,811 A | 11/1999 | Ueno et al. |
| 6,002,440 A | 12/1999 | Dalby et al. |
| 6,014,694 A | 1/2000 | Aharoni et al. |
| 6,016,307 A | 1/2000 | Kaplan et al. |
| 6,085,221 A | 7/2000 | Graf |
| 6,097,757 A | 8/2000 | Boice et al. |
| 6,101,221 A | 8/2000 | Varanasi et al. |
| 6,130,987 A | 10/2000 | Tanaka |
| 6,148,135 A | 11/2000 | Suzuki |
| 6,169,843 B1 | 1/2001 | Lenihan et al. |
| 6,195,368 B1 | 2/2001 | Gratacap |
| 6,223,211 B1 | 4/2001 | Hamilton et al. |
| 6,259,733 B1 | 7/2001 | Kaye et al. |
| 6,332,157 B1 | 12/2001 | Mighdoll et al. |
| 6,366,614 B1 | 4/2002 | Pian et al. |
| 6,366,705 B1 | 4/2002 | Chiu et al. |
| 6,381,254 B1 * | 4/2002 | Mori et al. ............... 370/537 |
| 6,397,251 B1 | 5/2002 | Graf |
| 6,438,317 B1 | 8/2002 | Imahashi et al. |
| 6,452,922 B1 | 9/2002 | Ho |
| 6,453,112 B2 | 9/2002 | Imahashi et al. |
| 6,502,125 B1 | 12/2002 | Kenner et al. |
| 6,522,693 B1 | 2/2003 | Lu et al. |
| 6,529,631 B1 | 3/2003 | Peterson et al. |
| 6,560,334 B1 | 5/2003 | Mullaney et al. |
| 6,678,332 B1 | 1/2004 | Gardere et al. |
| 6,704,288 B1 | 3/2004 | Dziekan et al. |
| 6,771,703 B1 | 8/2004 | Oguz et al. |
| 6,792,047 B1 | 9/2004 | Bixby et al. |
| 6,931,071 B2 | 8/2005 | Haddad et al. |
| 6,937,770 B1 | 8/2005 | Oguz et al. |
| 6,976,208 B1 | 12/2005 | Kim et al. |
| 7,016,970 B2 | 3/2006 | Harumoto et al. |
| 7,062,088 B1 | 6/2006 | Clauson |
| 7,082,167 B2 | 7/2006 | Alexandre et al. |
| 7,096,481 B1 | 8/2006 | Forecast et al. |
| 7,111,061 B2 | 9/2006 | Leighton et al. |
| 7,319,673 B1 | 1/2008 | Briscoe et al. |
| 7,328,150 B2 | 2/2008 | Chen et al. |
| 7,333,721 B2 | 2/2008 | Maehashi et al. |
| 7,340,505 B2 | 3/2008 | Lisiecki et al. |
| 7,430,329 B1 | 9/2008 | Sarna |
| 7,471,874 B2 | 12/2008 | Kanemaru et al. |
| 7,558,869 B2 | 7/2009 | Leon et al. |
| 7,620,137 B2 | 11/2009 | Lottis et al. |
| 7,676,107 B2 | 3/2010 | Gordon |
| 7,760,801 B2 | 7/2010 | Ghanbari et al. |
| 8,064,470 B2 | 11/2011 | Alvarez Arevalo et al. |
| 8,125,901 B2 | 2/2012 | Appleby et al. |
| 8,218,443 B2 | 7/2012 | Turnbull et al. |
| 2001/0025308 A1 | 9/2001 | Jinushi et al. |
| 2002/0031120 A1 | 3/2002 | Rakib |
| 2002/0090027 A1 | 7/2002 | Karczewicz et al. |
| 2002/0100052 A1 | 7/2002 | Daniels |
| 2002/0102978 A1 | 8/2002 | Yahagi |
| 2002/0136205 A1 | 9/2002 | Sasaki |
| 2002/0181584 A1 | 12/2002 | Alexandre et al. |
| 2003/0002482 A1 | 1/2003 | Kubler et al. |
| 2003/0053416 A1 | 3/2003 | Ribas-Corbera et al. |
| 2003/0145007 A1 | 7/2003 | Kenner et al. |
| 2003/0169777 A1 | 9/2003 | Fuse |
| 2003/0233666 A1 | 12/2003 | Onomatsu et al. |
| 2004/0098748 A1 | 5/2004 | Bo et al. |
| 2004/0141731 A1 | 7/2004 | Ishioka et al. |
| 2005/0021830 A1 | 1/2005 | Urzaiz et al. |
| 2005/0028133 A1 | 2/2005 | Ananth et al. |
| 2005/0071876 A1 | 3/2005 | van Beek |
| 2005/0117891 A1 | 6/2005 | Suzuki |
| 2005/0175251 A1 | 8/2005 | Taketa et al. |
| 2005/0286422 A1 | 12/2005 | Funato |
| 2005/0286488 A1 | 12/2005 | Briscoe et al. |
| 2005/0286631 A1 | 12/2005 | Wu et al. |
| 2006/0067362 A1 | 3/2006 | Ramakrishnan |
| 2006/0092836 A1 | 5/2006 | Kwan et al. |
| 2006/0120290 A1 | 6/2006 | Della Torre et al. |
| 2006/0224762 A1 | 10/2006 | Tian et al. |
| 2006/0238445 A1 | 10/2006 | Wang et al. |
| 2007/0009045 A1 | 1/2007 | Mohandas |
| 2008/0225728 A1 | 9/2008 | Plamondon |
| 2008/0304413 A1 | 12/2008 | Briscoe et al. |
| 2009/0074084 A1 | 3/2009 | Drezner et al. |
| 2009/0086816 A1 | 4/2009 | Leontaris et al. |
| 2010/0002951 A1 | 1/2010 | Zhai et al. |
| 2010/0034272 A1 | 2/2010 | Miyazaki et al. |
| 2010/0061446 A1 | 3/2010 | Hands et al. |
| 2010/0157121 A1 | 6/2010 | Tay |
| 2011/0019738 A1 | 1/2011 | Nilsson et al. |
| 2011/0243223 A1 | 10/2011 | Nilsson et al. |
| 2011/0292801 A1 | 12/2011 | Turnbull et al. |

FOREIGN PATENT DOCUMENTS

| | | |
|---|---|---|
| DE | 10125017 A1 | 12/2002 |
| EP | 0 703 711 | 3/1996 |
| EP | 0817488 A2 | 1/1998 |
| EP | 0868084 A1 | 9/1998 |
| EP | 0966175 A2 | 12/1999 |
| EP | 1 296 479 | 3/2003 |
| EP | 1 919 220 | 5/2008 |
| WO | 95/22233 | 8/1995 |
| WO | 96/35999 | 11/1996 |
| WO | 98/26604 | 6/1998 |
| WO | 99/05602 | 7/1998 |
| WO | 99/65026 | 12/1999 |
| WO | 01/89142 A2 | 11/2001 |
| WO | 02/49343 A1 | 6/2002 |
| WO | 02/095637 A2 | 11/2002 |
| WO | 03/084172 A1 | 10/2003 |
| WO | 2004/047455 | 6/2004 |
| WO | 2004/054274 | 6/2004 |
| WO | WO 2004/047455 | 6/2004 |
| WO | 2006/099082 | 9/2006 |
| WO | 2008/081185 | 7/2008 |
| WO | 2008/119954 | 10/2008 |
| WO | WO 2008/119954 | 10/2008 |
| WO | 2010/092323 | 8/2010 |
| WO | WO 2010/092323 | 8/2010 |

OTHER PUBLICATIONS

Crabtree, B. et al., "Equitable Quality Video Streaming", Consumer Communications and Networking Conference, 2009, (Jan. 10, 2009), pp. 1-5.
U.S. Appl. No. 12/522,121, filed Jul. 2, 2009.

(56) References Cited

OTHER PUBLICATIONS

U.S. Appl. No. 12/921,538, filed Sep. 8, 2010.
International Search Report for PCT/GB2008/001069 mailed Nov. 4, 2008.
Written Opinion for PCT/GB2008/001069 mailed Nov. 4, 2008.
UK Search Report dated Aug. 9, 2007 in GB0706424.9.
"Analysis of a Bandwidth Allocation Strategy for Proportional Streaming Services," E-Commerce Technology, 2004, CEC 2004, Proceedings, IEEE International Conference in San Diego, CA, USA Jul. 6-9, 2004, Piscataway, NJ, USA, Zhou & Xu, pp. 373-376, ISBN 0-7695-2098-7, XP010714145.
Balakrishnan, H., Devadas, S., Ehlert, D. and Arvind, "Rate Guarantees and Overload Protection in Input Queued Switches," INFOCOM 2004, Twenty-third AnnualJoint Conference of the IEEE Computer and Communications Societies Hong Kong, PR China Mar. 7-11, 2004, Piscataway, NJ, USA INFOCOM 2004, Twenty-third AnnualJoint Conference of the IEEE, pp. 2185-2195, vol. 4, ISBN 0-7803-8355-9, XP010740588.
Office Action (5 pgs.) dated May 22, 2009 issued in corresponding Chinese Application No. 200580009650.1 with an at least partial English-language translation thereof.
English-language translation of Notice of Reasons for Rejection dated Apr. 1, 2010, issued in corresponding Japanese Application No. 2007-504458.
English-language translation of Decision of Rejection dated Dec. 20, 2010 issued in corresponding Japanese Application No. 2007-504458.
International Search Report re PCT/GB2004/001253 mailed Sep. 15, 2004 (search conducted Sep. 8, 2004).
Hwang, et al., "ITU-T Recommendation H.261 Video Coder-Decoder," 1997, Digital Consumer Electronics Handbook, XX, XX, pp. 1001-1026, I, XP001059410.
Anastasiadis, et al., "Server-Based Smoothing of Variable Bit-Rate Streams," ACM Multimedia, 2001, pp. 147-158.
Zimmermann, et al., "A Multi-Threshold Online Smoothing Technique for Variable Rate Multimedia Streams," (Abstract only—published 2006) at http://idefix.usc.edu/pubs/mtfc.html.
Mohan, et al.,"Adapting Multimedia Internet Content for Universal Access," IEEE Transactions on Multimedia, vol. 1, No. 1, Mar. 1999, pp. 104-114.
Makaroff, et al., "An Evaluation of VBR Disk Admission Algorithms for Continuous Media File Servers," Proc. of ACM Multimedia '97, Seattle, Washington (1997).
International Search Report, Appln. No. PCT/GB2004/003331, dated Sep. 28, 2004.
UK Search Report, Appln. No. GB 0319251.5, dated Dec. 16, 2003.
Office Action issued in European Appln. No. 05718057.2, dated Oct. 18, 2007.
Guojun Lu et al, "An Efficient Communication Scheme for Media On-Demand Services with Hard QoS Guarantees", Journal of Network and Computer Applications, 'Online!, vol. 21, No. 1, Jan. 1998, pp. 1-15, XP002328926.
Yeom et al, "An Efficient Transmission Mechanism for Stored Video", Protocols for Multimedia Systems—Multimedia Networking, 1997, Proceedings, IEEE Conference on Santiago, Chile Nov. 24-27, 1997, Los Alamitos, CA, USA, IEEE Comput. Soc., US, Nov. 24, 1997, pp. 122-130, XP010258820.
McManus et al., "Video-On-Demand Over ATM: Constant-Rate Transmission and Transport", IEEE Journal on Selected Areas in Communications, IEEE Inc., New York, US, vol. 14, No. 6, Aug. 1, 1996, pp. 1087-1098, XP000608049.
Karczewicz et al. "A Proposal for SP-Frames", document VCEG-L-27, ITU-T Video Coding Experts Group Meeting, Eibsee, Germany, Jan. 9-12, 2001.
Karczewicz et al, "SP-Frame Demonstrations", document VCEG-N42, ITU-T Video Coding Experts Group Meeting, Santa Barbara, CA, USA, Sep. 24-27, 2001.
Dapeng Wu et al, "Streaming Video Over Internet: Approaches and Directions", IEEE Transactions on Circuits and Systems for Video Technology, vol. 11, No. 3, Mar. 2001.
Conklin et al., "Video Coding for Streaming Media Delivery on the Internet", IEEE Transactions on Circuits and Systems for Video Technology, vol. 11, No. 3, Mar. 2001.
Jammeh et al., "Transporting Real Time Transcoded Video over Internet Using End to End Control", PV2002, Apr. 2002.
Cai et al., "Rate-Reduction Transcoding Design for Video Streaming Applications", PV 2002, Apr. 2002.
Rejaie et al, "Layered Quality Adaptation for Internet Video Streaming", IEEE Journal on Selected Areas in Communications, vol. 18, No. 12, Dec. 2000.
Feamster et al, "On the Interaction Between Layered Quality Adaptation and Congestion Control for Streaming Video", PV2001, Apr. 2001.
Licandro et al, A Rate/Quality Controlled MPEG Video Transmission System in a TCP-Friendly Internet Scenario, PV 2002, Apr. 2002.
Active IETF Working Groups, Nov. 20, 2006, http://www.ietf.org/html.charters/wg-dir.html#TransportArea, 11 pages.
Differentiated Services (diffserv), http://www.ietf.org/html.charters/diffserv-charter.html, Sep. 9, 2009, 3 pages.
Multiprotocol Label Switching (mpls), http:/www.ietf.org/html.charters/mpls-charter.html, Mar. 24, 2006, 4 pages.
Resource Reservation Setup Protocol (rsvp), http://www.ietf.org/html.charters/rsvp-charter.html, Mar. 30, 2001, 2 pages.
Integrated Services (intserv), http://www.ietf.org/html.charters/intserv-charter.html, Sep. 5, 2000, 3 pages.
Blake et al., "An Architecture for Differentiated Services", in RFC-2475, Dec. 1998.
Braden et al, "Integrated Service in Internet Architecture: An Overview", in RFC-1633, Jun. 1994.
Mitzel et al, "A Study of Reservation Dynamics in Integrated Services Packet Networks", in Proceedings of the Conference on Computer Communications (IEEE INFOCOM 1996), p. 871-879, Mar. 1996.
Foster et al., "A Quality of Service Architecture that Combines Resource Reservation and Application Adaptation", IWQOS2000, Jun. 2000.
Lu et al., "Understanding Video Qaulity and its Use in Feedback Control", PV 2002, Pittsburgh, Pennsylvania, USA, Apr. 24-26, 2002.
Yang et al., "Rate Control for VBR Video over ATM: Simplification and Implementation", IEEE Transactions on Circuits and Systems for Video Technology, vol. 11, No. 9, Sep. 2001.
Reed et al., "Constrained Bit-Rate control for Very Low Bit-Rate Streaming-Video Applications", IEEE Transaction on Circuits and Systems for Video Technology, vol. 11, No. 7, Jul. 2001.
Furini et al., "Real-Time Traffic Transmissions over the Internet", IEE Transactions on Multimedia, vol. 3, No. 1, Mar. 2001, pp. 33-40,XP002273256.
Chang et al., "Dynamic Window-based Traffic-Smoothing for Optimal Delivery of Online VBR Media Streams", Parallel and Distributed Systems, 2000, Los Alamitos, CA, USA, IEEE Comput.Soc. US, Jul. 4, 2000, pp. 127-134, XP0101504391.
Assuncao et al., "Transcoding of Single-Layer MPEG Video Into Lower Rates", IEE Proceedings;Vision, Image and Signal Processing, Institution of Electrical Engineers, GB, vol. 144, No. 6, Dec. 19, 1997, pp. 377-383, XP006009073.
Karczewica et al:, "The SP- and SI-Frames Design for H.264/AVC", IEEE Transactions on Circuits and Systems for Video Technology, IEEE Inc., New York, US, vol. 13, No. 7, Jul. 2003, pp. 637-644, XP001051192.
Braden et al, "Resource ReSerVation Protocol (RSVP)", in RFC-2205, Sep. 1997.
Ng, "A Reserved Bandwidth Video Smoothing Algorithm for MPEG Transmission", The Journal of Systems and Software 48 (1999), pp. 233-245.
Salehi et al., "Supporting Stored Video: Reducing Rate Variability and End-to-End Resource Requirements through Optimal Smoothing", Technical Report: UM-CS-1995-098, University of Massachusetts 1995.
U.S. Appl. No. 13/133,757, filed Jun. 9, 2011.
International Search Report for PCT/GB2008/000010, mailed Jul. 8, 2008.

(56) References Cited

OTHER PUBLICATIONS

Written Opinion for PCT/GB2008/000010, mailed Jul. 8, 2008.
H.264/AVC, EBU Technical Review, Jan. 2003, R. Schafer, T. Wiegand, and H. Schwarz, available from: http://www.ebu.ch/en/technical/trev/trev_293-schaefer.pdf.
International Search Report for PCT/GB2010/000166, mailed Nov. 5, 2010.
Ely, D. et al., "Robust Congestion Signaling", International Conference on Network Protocols 2001 Institute of Electrical and Electronics Engineers Computer Society US, [Online] (Nov. 11, 2001), pp. 332-341.
Spring, D. et al., "Robust Explicit Congestion Notification (ECN) Signaling with Nonces", Ely University of Washington N., (Jun. 1, 2003), pp. 1-3.
Ramakrishnan, TeraOptic Networks; S. Floyd, Aciri; D. Black, EMC; "The Addition of Explicit Congestion Notification (ECN) to IP", IETF Standard, Internet Engineering Task Force, Sep. 1, 2001.
International Search Report mailed Mar. 11, 2004 in International Application No. PCT/GB03/04996 (2 pages).
International Search Report mailed May 20, 2005 in International Application No. PCT/GB2005/001011 (5 pages).
UK Search Report dated Aug. 3, 2004 in Application No. GB 0406901.9 (1 page).
International Search Report published Dec. 23, 2010 in International Application No. PCT/GB2010/000163 (4 pages).
Office Action (15 pgs.) dated Feb. 19, 2013 issued in co-pending U.S. Appl. No. 12/921,538.
Office Action (17 pgs.) dated Oct. 11, 2013 issued in co-pending U.S. Appl. No. 12/921,538.
International Search Report for PCT/GB2009/000543, mailed May 8, 2009.
"Differentiated End-to-End Internet Services using a Weighted Proportional Fair Sharing TCP", by Crowcroft and Oechslin, ACM SIGCOMM, vol. 28, pp. 53-69, Jul. 1998.
"Multiple bitstream switching for video streaming in monotonically decreasing rate schedules", by Alam, Khan and Ghanbari IEEE International Conference on Industrial Technology 2006, Dec. 15-17, 2006, pp. 973-978.
Methodology for the subjective assessment of the quality of television pictures, International Telecommunications Union recommendation B.T.500-11, 2002 (48 pgs.).
Mulroy, P. et al.. "The Use of MULTCP for the Delivery of Equitable Quality Video", BT Innovate, Broadband Applications Research Centre, Ipswich, UK, 2009 (9 pgs.).
International Search Report (3 pgs.) dated Nov. 17, 2010 issued in International Application No. PCT/GB2010/000217.
Crabtree et al., "Equitable Quality Video Streaming", Consumer Communications and Networking Conference, 2009, CCNC 2009, 6th IEEE, Piscataway, NJ, Jan. 10, 2009, pp. 1-5.
Notice of Allowance (9 pgs.) dated Nov. 13, 2014 issued in co-pending U.S. Appl. No. 13/201,261.
Office Action (17 pgs.) dated Dec. 24, 2014 issued in co-pending U.S. Appl. No. 12/921,538.
Office Action (14 pgs.) dated Jul. 25, 2014 issued in co-pending U.S. Appl. No. 13/201,261.

* cited by examiner

MULTIPLEXED VIDEO STREAMING

This application is the U.S. national phase of International Application No. PCT/GB2009/002827 filed 7 Dec. 2009, which designated the U.S. and claims priority to EP Application No. 08253946.1 filed 10 Dec. 2008, the entire contents of each of which are hereby incorporated by reference.

BACKGROUND AND SUMMARY

The invention is concerned with video compression and streaming in which a plurality of video sources share a transmission link. It is particularly, though not exclusively, applicable to the delivery of video encoded at a number of different constant quality levels over a shared backhaul network.

Traditionally a video on demand service, such as BT Vision, is supported by encoding video at a constant bit rate and delivering it over a network at the same constant bit rate. This generally requires bandwidth reservation on the network, which can be expensive to provide. Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly. Hence to overcome these problems we propose equitable quality streaming, where the aim is not to share bandwidth equally between concurrent video sessions, but to divide it so that the same video quality can be delivered to each user. The need for bandwidth reservation is removed, with the video delivery system adapting the quality and delivery rate of each concurrent video session so as to meet the overall bit rate constraint.

According to the present invention there is provided a method of transmitting a plurality of video streams, over a transmission link, comprising, at intervals:

choosing for each stream an encoder setting such that the sum of the bit rates generated by encoding the streams shall not exceed the capacity of the link;

determining for each stream, having regard to the amount of data buffered at a receiver for that stream, and to the minimum bit rate needed to transmit the remainder of that stream at the chosen encoder setting, the time at which that bit rate ceases to be needed; and allocating any surplus capacity of the transmission link to that stream that has the earliest such time.

Other, preferred, aspects of the invention are set out in the claims.

DETAILED DESCRIPTION OF PRESENT EXAMPLE EMBODIMENTS

Some embodiments of the invention will now be described, by way of example, with reference to the accompanying drawings. We model the network as a video server connected to a number of client devices over a shared backhaul. Multiple pieces of video content are encoded at a number of constant quality levels and stored on a network based server. This can be done by using a number of fixed encoder settings (e.g. quantization levels) for each piece of video. In response to requests from users, video content is selected on the server and delivered over the shared network to the user. The system selects the quality level to deliver based on the video content currently being delivered and the amount of video data already buffered at the video receivers. The aim is to deliver the same quality of video to each user. A specific quality level for all simultaneous streams must be selected, subject to satisfying the constraint that the sum of bit rates required is less than the available network capacity. In general, as the video content is encoded at a finite number of constant quality levels, the sum of the required bit rates will be less than the network capacity.

Figure 1:
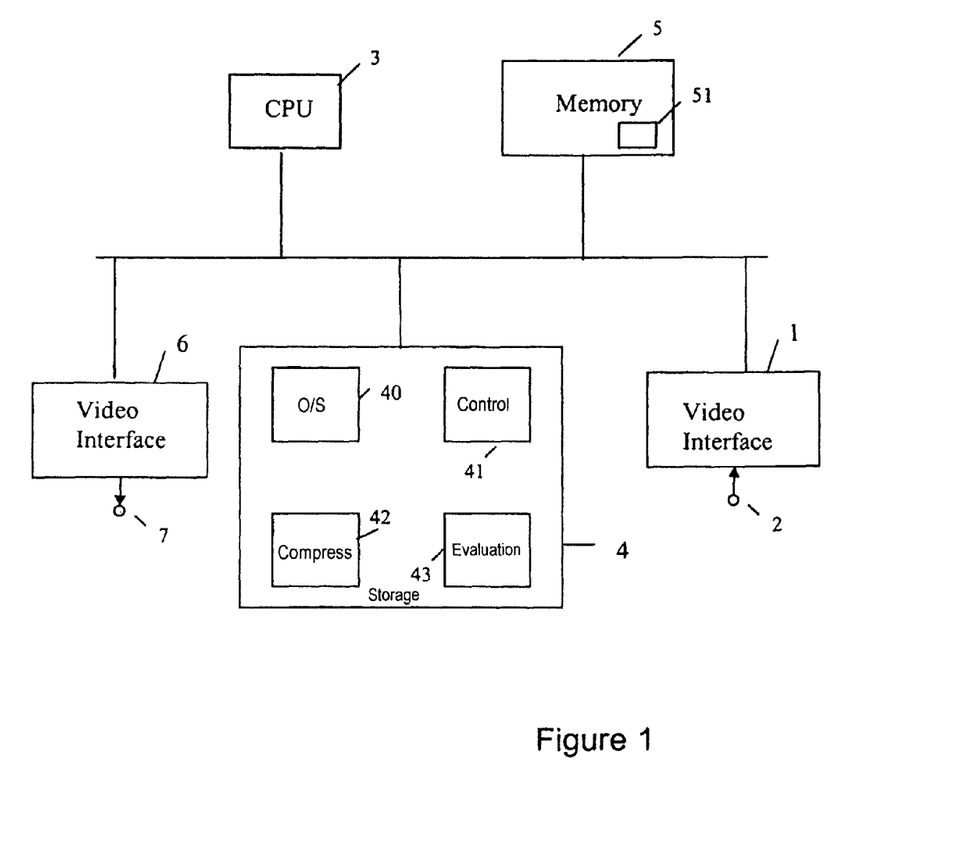
FIG. 1 shows a server which implements an example embodiment of the invention.

The server shown in FIG. 1 comprises a video interface 1 that receives digitally coded video signals, in uncompressed form, at a video input 2. A processor 3 operates under control of programs stored in disc storage 4 and has access to memory 5 and a video output interface 6 that feeds an output 7 for connection, via a telecommunications network to plural client devices. The memory 5 includes a memory area 51 for temporary storage of picture parameters. The programs include a general purpose operating system 40 and video coding software which implements one of more of the coding methods shortly to be described. This software comprises several programs (or groups of programs), namely control software 41;

compression software 42: in this example the compression software implements a coding algorithm compliant with the ITU H.264 standard;

perceptual quality evaluation software 43.

It is understood that plural video streams can be received and stored in storage 4, for later streaming via the interface 6.

A video sequence that has been encoded at variable bit rate can be delivered over a network at piecewise constant bit rate, with the rate of each piece decreasing monotonically. This is believed to have first been noted by Professor Mohammed Ghanbari. He referred to the resulting bit rate profile as a "downstairs" function.

According to current assignee's international patent application (Ghanbari and Sun), published as WO2004/047455, delivery of variable bit-rate video can usefully be analysed as follows:

Consider, at a receiver, some arbitrary time segment (but equal to a whole number of frame periods), extending from time $t_g$ at which the decoder begins to decode frame g to time $t_h$ at which the decoder begins to decode frame h. The duration of this segment is that of h−g GOP periods, that is, $t_h - t_g$. Suppose, further, that the transmission rate during this segment is A bits/frame period.

Obviously, at time $t_g$, the receiver must have already received the bits for all frames up to and including frame g, i.e.

$$\sum_{j=0}^{g} d_j \text{ bits}$$

where $d_j$ is the number of coded bits generated by the encoder for frame j.

Suppose however that the receiver has, prior to time $t_g$, also received p additional bits (preloaded bits in receiver buffer), that is, in total, $$\sum_{j=0}^{g} d_j + p \text{ bits.}$$

At any time $t_k$ ($t_g \le t_k \le t_h$), at which the receiver begins to decode frame k, the receiver has also received (k−g)A bits, so:

$$\text{Total bits received at time } t_k = \sum_{j=0}^{g} d_j + p + (k-g)A. \quad [1]$$

At this point, the receiver needs to have all the bits for frames up to and including frame k, that is:

$$\text{Total bits needed at time } t_k = \sum_{j=0}^{k} d_j. \quad [2]$$

Since the number of bits received must be at least equal to the number needed, the condition that needs to be satisfied to avoid buffer underflow is $$\sum_{j=0}^{g} d_j + p + (k-g)A \ge \sum_{j=0}^{k} d_j \quad [3]$$

Or $$p + (k-g)A \ge \sum_{j=g+1}^{k} d_j \quad [4]$$

If this is to be achieved without the transmission of preload bits p, this requires that $$(k-g)A \ge \sum_{j=g+1}^{k} d_j \quad [5]$$

Or, $$A \ge \frac{1}{(k-g)} \sum_{j=g+1}^{k} d_j. \quad [6]$$

Thus, the transmitted rate A must be greater than or equal to the average generated bits per frame over frames g+1 to k, for any value of k (g+1≤k≤h), which will be achieved if $$A \ge \underset{k=g+1}{\overset{h}{\text{Max}}} \left\{ \frac{1}{(k-g)} \sum_{j=g+1}^{k} d_j \right\}. \quad [7]$$

Use of this rate means that the number of bits (h−g)A transmitted during the segment will exceed the number of bits generated for the segment, unless the maximum occurs for k=h, that is, at the end of the segment. On the premise that the continued use of the transmission rate thus calculated, after the maximum has passed, seems to represent the use of a rate higher than absolutely necessary, Ghanbari aimed to partition the data to be transmitted into segments in such a manner that these maxima always occurred at the end of segment. In the patent application, this situation was visualised graphically by plotting, for each segment, average bit rate (over the relevant period k to g) against time.

Figure 2:
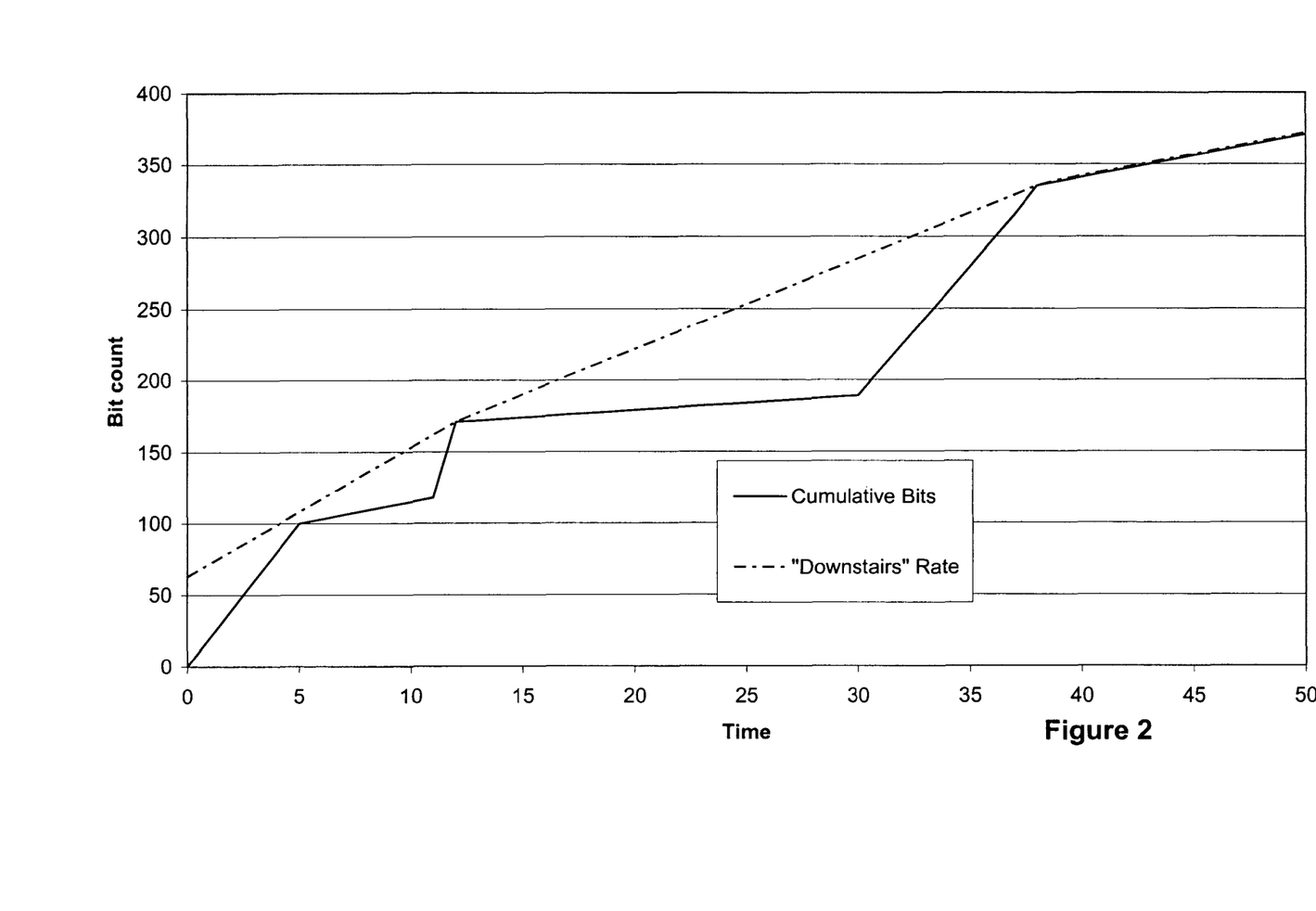
FIG. 2 shows a plot of the cumulative bit profile of the coded video sequence and a hypothetical bit consumption trajectory.

An alternative visualisation is to consider a plot of the cumulative bit profile of the coded video sequence, as shown in FIG. 2. This is simply a plot of the total number of bits in the coded video sequence to date against time. This is a more convenient representation, as only a single plot is then needed; the reality is however unchanged. The delivery rate required for initial delivery of this stream is the slope of the line of lowest slope that passes through the origin or (as shown) some initial buffer preload point and is never to the right of the cumulative bit profile, that is, ensuring all bits are delivered before they are needed for decoding. Such a delivery line (or delivery schedule) will touch the cumulative bit profile in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this rate.

The above results are expressed in terms of frames. In the examples considered here, we consider discrete "chunks" each comprising one or more frames. Choice of chunks is subject to the consideration that, in order to keep to a minimum any interdependence of quality between chunks, a chunk can be one or more frames coded independently of any other chunk, typically starting with an I-frame (one coded without prediction from any other frame). In all the examples here, the chunk chosen was a Group of Pictures (GOP) of IBBP format and all the plots shown are of cumulative bits per GOP, $\Sigma_b$, where b is the number of bits in a GOP, plotted against GOP number.

A hypothetical bit consumption trajectory plotted in this manner is shown in FIG. 2, where we see, for example, that with a buffer preload of p=65 bits, one can draw the dot-dash line which just meets the trajectory at GOP g=12 and nowhere else. So transmission at the bit rate represented by the slope of this line is the minimum necessary to provide satisfactory operation up to that point i.e. the minimum transmission rate required to avoid receiver buffer underflow. The slope at the commencement of transmission may be written thus (by rewriting Equation [7] this time in terms of GOPs and retaining p):

$$A = \underset{k=1}{\overset{h}{\text{Max}}} \left\{ \frac{\sum_{j=1}^{k} b_j - p}{k} \right\} \quad [8]$$

where $b_j$ is the number of bits generated by encoding of GOP j. For later GOPs, the relation is $$A = \underset{k=g+1}{\overset{h}{\text{Max}}} \left\{ \frac{\sum_{j=g+1}^{k} b_j - p}{(k-g)} \right\} \quad [9]$$

It can also be observed that from g=12 onwards, the slope (bit rate) can be reduced until the line comes to meet the trajectory at g=38, after which the slope can follow the trajectory itself. Thus, the highest transmission rate is from g=0 to g=12, after which time it drops down from g=12 to g=38, and again after g=38. We refer to the points at which these transmission rate lines meet the cumulative bits trajectory (at g=12 and 38) as "critical points", which will become important later in this description. If a line touches the trajectory more than once, the critical point is the latest such point.

In the case of equitable quality video streaming, the aim is to divide the backhaul bandwidth between the concurrent sessions to enable the same best quality to be delivered in each session. We assume the client device has sufficient buffering to be able to store a whole video stream. This allows the timing of delivery of the video data to be decoupled from the decoding of it, provided we ensure data is delivered before it is needed for decoding.

The delivery bit rate required to deliver a given video stream in timely fashion depends on how much data is already buffered at the client, and the bit rate profile of the bits yet to be decoded. By pre-analyzing all of the video streams, and by monitoring the amount of data buffered at the client, we can determine, for each concurrent video session, for each possible quality level that could be delivered, the bit rate required for timely delivery.

Whenever a session starts or ends, and at each GOP period, we calculate, for each concurrent video session and for each quality level, the bit rate required for the session, given the current amount of data already buffered at the client. We sum these rates for each quality level, and select the highest quality requiring less total bit rate than the network capacity, and deliver this quality on all sessions from this point in time, regardless of the quality level previously delivered. We prefer to equalise the perceptual quality, as described in current assignee's co-pending European patent application no. 0825081.5 . This however is not essential; indeed in the present context it is not necessary to equalise quality at all: the invention will work with any method of choosing the encoder settings and thus resulting perceptual quality.

Dealing with these steps in more detail, the following methods assume that there are S video streams designated s (s=1 ... S). First we will describe an exact, but computationally onerous method; later, we will describe a faster, but more approximate, method.

Pre-Calculations

100 Each source video stream (s=1 ... S) is encoded at a number of different fixed quality levels $L_q$ (q=1 ... Q) by choosing appropriate encoder settings. The amount of data $b_{sqg}$ generated for each GOP (g=1 ... G) is recorded. Note that G is not necessarily the same for all streams. Also, g is not the same for simultaneous GOPs across streams.

During Delivery the Following Steps are Performed Before Delivering Each Group of Pictures

102 For each video stream that is being delivered, calculate how much data p is buffered in the decoder buffer, in terms of time, $\tau_{sg}$, this is effectively a start-up delay for the next data to be delivered. This (assuming that the units of time are GOP periods) is simply a count of the number of GOPs transmitted, minus the time that has elapsed since the commencement of transmission.

104 Then for each video quality level $L_q$, starting at the highest quality and working downwards:

a) calculate, for each video stream, the delivery rate $A_{sqg}$ that would be needed to deliver GOP g+1 and all subsequent GOPs at this quality without decoder buffer underflow occurring, knowing the amount of time $\tau_{sg}$ buffered for that stream, and find the maximum of these and the only or last GOP at which this maximum occurs, which is identified for future reference as the critical point. This is done using a modified equation (9) as shown below.

Figure 3:
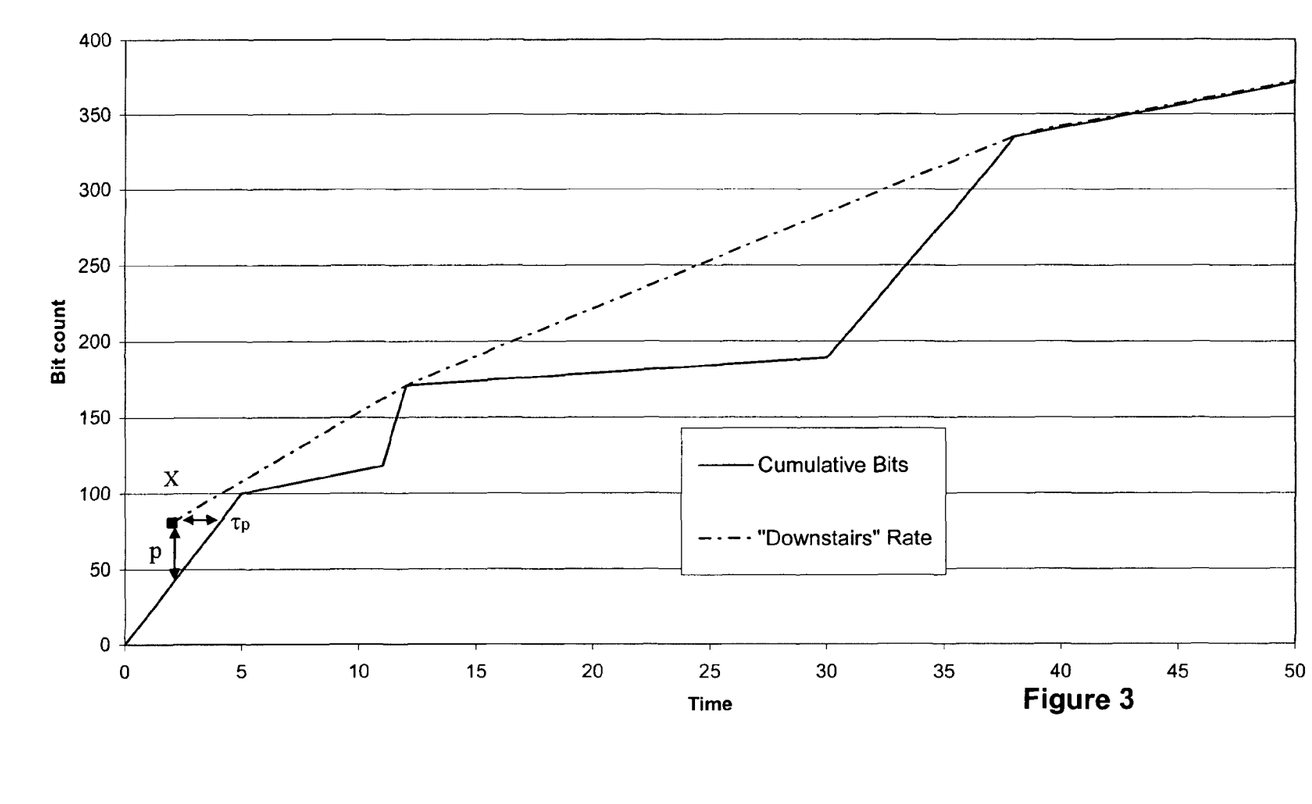
FIG. 3 shows, under the supposition of that g=2, bits as shown at X that have been delivered.

Referring to FIG. 3, suppose that g=2. Bits as shown at X have been delivered. There is a buffer preload of p bits which represents a playing time of $\tau_{sg}$ whole GOP periods already buffered at the client in addition to GOP 2 itself. At the time that GOP g is being decoded, GOP g+$\tau_{sg}$ has been delivered and buffered. We calculate the rate to deliver subsequent GOPs up to and including GOP k for all values of k up to h, and find the maximum of these, rate $A_{sqg}$ as in Equation 10, noting that the time available to deliver these GOPs is greater than their decoding duration by the amount of time already buffered, $\tau_{sg}$.

Thus, the rate needed for delivery is $$A_{sqg} = \text{Max}_{k=g+1+\tau_{sg}}^{h} \left\{ \frac{1}{k-g} \sum_{j=g+1+\tau_{sg}}^{k} b_{sqj} \right\} \quad [10]$$

The critical point is at $$\text{ArgMax}_{k=g+1+\tau_{sg}}^{h} \left\{ \frac{1}{k-g} \sum_{j=g+1+\tau_{sg}}^{k} b_{sqj} \right\} \quad [11]$$

which can be seen to occur in this particular example at k=12.

b) sum these rates:

$$A_{Tqg} = \sum_{s=1}^{S} A_{sqg} \quad [12]$$

and if the sum is less than the channel rate C stop, otherwise continue to the next lower quality.

In practice, a mechanism is needed to cater for the possibility that the network is so heavily loaded that the available rate C is insufficient to support transmission of all S streams even at the lowest quality; this might be as simple as not to allow more than a fixed number of streams to be delivered at any one time, or could include a mechanism to suspend or shut down transmission of one or more streams.

106 Calculate the spare bandwidth, as the channel rate less the sum of the rates required by the video streams $$= C - \sum_{s=1}^{S} A_{sqg} \quad [13]$$

The next stage is to allocate this spare capacity appropriately. Some discussion is in order here. Consider the case of two coded video streams being delivered over a shared network connection. Suppose they need delivery rates R1 and R2, and that at these delivery rates, the critical points (measured in units of time) are T1 and T2. It is therefore required that R1*T1 bits are delivered from stream 1 in time T1 to ensure correct decoding is possible, and similarly for stream 2. Suppose the network rate is C, and that R1+R2<C. The question is how should this excess network bandwidth be allocated to the two streams optimally? Suppose in the next unit of time, B1 and B2 bits of each stream are delivered, with B1>=R1 and B2>=R2. The delivery rates needed for the two streams after this unit of time will be equal to (R1*T1−B1)/(T1−1) and (R2*T2−B2)/(T2−1).

The sum of these two delivery rates is $$\frac{R1T1 - B1}{T1 - 1} + \frac{R2T2 - B2}{T2 - 1} \quad [14]$$

$$= \frac{(R1T1 - B1)(T2 - 1) + (R2T2 - B2)(T1 - 1)}{(T1 - 1)(T2 - 1)} \quad [15]$$

$$= \frac{(R1 + R2)T1T2 - R1T1 - R2T2 - B1T2 - B2T1 + B1 + B2}{(T1 - 1)(T2 - 1)} \quad [16]$$

Noting that $B1 + B2 = C$:

$$= \text{Constant} + \frac{B1(T1 - T2)}{(T1 - 1)(T2 - 1)} \quad [17]$$

If T1<T2, this function is minimised by maximising B1, whereas if T1>T2, B1 should be minimised.

Thus, the sum of these two new delivery rates can be minimised by setting B1=R1 and B2=C−R1 if T2<T1; and B1=C−R2 and B2=R2 if T1<T2. In the case of T1=T2, the allocation does not matter.

It can be shown that, for three or more streams, the optimum result is the same, namely, to allocate all of this spare capacity to the video stream that has the next nearest, or earliest, critical point.

108 The allocation of the surplus capacity to the stream having the earliest critical point is straightforward, as the timing of the critical point for each stream at the chosen quality has already been determined at Step 104.

We now describe a similar, less exact, but faster method:

Pre-Calculations

200 As before, each source video stream (s=1 . . . S) is encoded at a number of different fixed quality levels $L_q$ (q=1 . . . Q). The amount of data $b_{sqg}$ generated for each GOP is recorded.

201 The resulting bitstreams are analysed to create a file of pre-calculated data, one for each source video stream, giving the following information for each quality at which the content was encoded for each group of pictures:

a) The minimum delivery rate $D_{sqg}$ that would be needed for delivery (transmission) of that GOP and all subsequent GOPs without decoder buffer underflow occurring if no time is initially buffered at the decoder.

If the encoding of GOP g of stream s at quality level $L_q$ generates $b_{sqg}$ bits, then the transmission of GOPs g to j requires a rate of $$\frac{\sum_{i=g}^{j} b_{sqi}}{t_j - t_{g-1}} \quad [18]$$

and the condition for this to be equalled or exceeded for all g≤j≤G is $$D_{sqg} = \text{Max}_{j=g}^{G} \left\{ \frac{\sum_{i=g}^{j} b_{sqi}}{t_j - t_{g-1}} \right\} \quad [19]$$

b) The minimum amount of time $T_{sqgr}$ that must be buffered at the decoder for delivery (transmission) of that GOP and all subsequent GOPs without decoder buffer underflow occurring at each of a set of delivery rates $D_{sqr}$ (r=1 . . . R). These rates $D_r$ may be fixed multiples of the average rate for that stream at that quality.

This time may be visualised as being obtained by drawing, on FIG. 3, a line of slope $D_{sqr}$ sufficiently to the left of the cumulative bits trajectory as not to touch it; the line is then moved to the right until it just touches the portion of the trajectory to the right of (or at) g. The vertical distance at g between the line and the trajectory in then the required pre-load in bits whereas the horizontal distance between the line and the trajectory is what we require, the required pre-load expressed as a time. The procedure, in more detail is:

define a line of slope $D_{sqr}$ through the origin measure the vertical distances of the line below the trajectory find the largest of these distances, which is the required preload in bits divide this largest distance by the slope $D_{sqr}$ to obtain the preload in terms of time.

N.B. If the line is always above the trajectory and all the distances are negative, the required preload is zero.

During Delivery the Following Steps are Performed Before Delivering Each Group of Pictures

202 For each video stream that is being delivered, calculate (as in 102 above) how much data $\tau_{sg}$ is buffered in the decoder buffer, in terms of time—this is effectively a start-up delay for the next data to be delivered.

204 Then for each video quality level $L_q$, starting at the highest quality and working downwards:

a) calculate, for each video stream, the delivery rate $d_{sqg}$ that would be needed to deliver GOP g and all subsequent GOPs at this quality without decoder buffer underflow occurring, knowing the amount of time buffered for that stream using the pre-calculated data. This may be calculated by an interpolation method, as follows.

Figure 4:
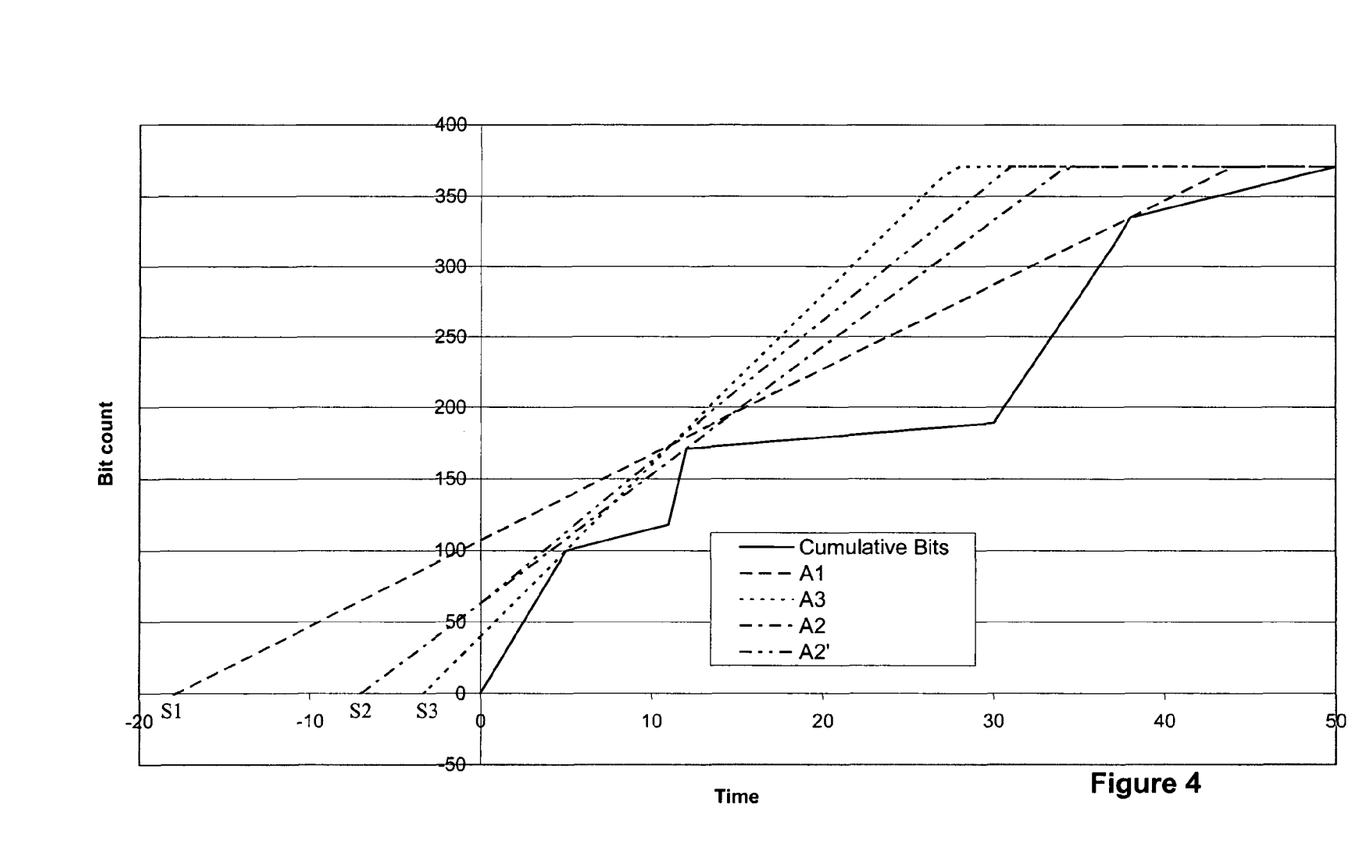
FIG. 4 shows a hypothetical bit consumption trajectory and bit delivery trajectories for three delivery bit rates.

We need to know the delivery rate required given the amount of data already buffered at the client, which if measured in terms of the play-out time it represents, corresponds to the start-up delay allowed for the next data to be delivered. As it is not feasible to pre-calculate for all possible values of start-up delay, we estimate the delivery rate from the information that we have pre-calculated. FIG. 4 shows, as well as the hypothetical bit consumption trajectory already explained, bit delivery trajectories for three delivery bit rates, A1, A2 and A3. The optimal start-up delays, S1 and S3, for the delivery rates A1 and A3 respectively have been pre-calculated. The optimum rate for the required start-up delay S2, where S2 is between S1 and S3, would be A2 and would give the dot-dash line shown. The problem then is to provide an estimated value A2' for the delivery rate A2 required for start-up delay S2.

To ensure timely delivery of bits, the delivery schedule A2' must be on or to the left of the cumulative bit trajectory. This is ensured if the delivery schedule A2' passes through the intersection of the delivery schedules, A1 and A3, which occurs at time T, given in Equation [20]. An acceptable delivery rate for start-up delay S2 is the straight line of slope A2' passing through this point, given by Equation [21]. As shown in FIG. 4, this may not optimal.

$$T=(S3·A3-S1·A1)/(A1-A3) \quad [20]$$

$$A2'=(S1+T)·A1/(S2+T) \quad [21]$$

This gives the wanted delivery rate $d_{sqg}$.

b) sum these rates:

$$d_{T_{qg}} = \sum_{s=1}^{S} d_{sqg} \quad [22]$$

and if the sum is less than the channel rate C stop, otherwise continue to the next lower quality.

206 Calculate the spare bandwidth, as the channel rate less the sum of the rates required by the video streams $$= C - \sum_{s=1}^{S} d_{sqg} \quad [23]$$

208 The next stage is to allocate this spare capacity appropriately, as discussed above. Here, however, the use of the approximate method of determining the rate often results in a rate that exceeds that determined by exact calculation and in consequence a plot of actual delivery rate no longer strikes the cumulative required bits trajectory at the theoretically determined critical point, or maybe not at all. Knowledge of the critical points is essential to the allocation of surplus capacity and what we require is to determine, or at least estimate, the position of the critical point that would have been obtained using the exact method of Step 104. One possible approach to this is to simulate delivery of the remainder of the video stream at the required rate calculated in 204, identify the point in time at which the minimum amount number of bits of data was buffered, and determine this time as the critical point for this stream. The value may not go to zero as the required rate has been obtained by interpolation and hence could be higher than actually needed. This is computationally complex, and in tests was found to be prone to finding critical points in the very near future when the amount of time currently buffered is low.

Our preferred implementation, therefore, involves pre-calculating the critical points using the method described in section 104 above, and storing this information for each video stream and for each quality, as a set of (time by which they must be delivered, number of bits that must be delivered) pairs. Then at the current point, knowing how much has already been delivered and in what time, the rate required by each of the subsequent pre-calculated critical points can be calculated, the maximum of these determines the actual most critical point, and the time of this is the desired time of the critical point. The amount currently delivered is the amount of time delivered, or its equivalent number of bits for the quality currently being delivered (regardless of which quality was actually delivered). This all works provided the current amount delivered is on or ahead of the pre-calculated downstairs requirements, which would generally be true, but may not be after switching quality. If delivery is behind the downstairs rate (to the right of it), then there may be a close critical point which was not in the original downstairs set. This may well be acceptable, but if desired one could, following a switch, apply the Ghanbari method on the fly, knowing that such a critical point, if it exists, must occur before the next pre-calculated one.

An alternative is to pre-calculate the position of the next critical point when zero data is buffered, and to use this time rather than running the Ghanbari method on the fly. It may occasionally lead to getting the wrong value of critical time and wrong stream to allocate to, but gives a saving in computational complexity.

What is claimed is:

1. A method of transmitting a plurality of video streams, over a transmission link, comprising, at intervals:
    determining for each video stream at each of a plurality of encoder settings, having regard to the amount of data buffered at a receiver for that stream, a bit rate sufficient to transmit the remainder of that stream at that encoder setting such as to avoid buffer underflow at the receiver, and a critical point equal to the earliest time at which that bit rate can be reduced while still avoiding buffer underflow at the receiver; wherein the bit rate for transmission of that stream monotonically decreases, and the bit rate for transmission of that stream after the critical point is always less than the bit rate for transmission of that stream before the critical point;
    choosing for each video stream an encoder setting such that the sum of said bit rates required for transmission of the streams does not exceed the capacity of the transmission link; and
    allocating any surplus capacity of the transmission link to the stream that has the earliest critical point.

2. A method according to claim 1 in which the bit rates chosen for each stream are in each case, having regard to the amount of data buffered at a receiver for that stream, the minimum bit rate needed to transmit the remainder of that stream at the chosen encoder setting.

3. A method according to claim 1 further comprising analysing each stream, at each of a plurality of encoder settings and for each of a plurality of temporal positions of the stream, to generate data relating to a discrete plurality of minimum buffer preload and data rate combinations that are capable of transmitting the stream, or as the case may be the remainder of the stream, at the chosen encoder setting, and to store these data; in which the bit rates chosen for each stream are in each case, having regard to the amount of data buffered at a receiver for that stream, an estimated bit rate greater than or equal to the minimum bit rate needed to transmit the remainder of that stream at the chosen encoder setting, determined by interpolation from the stored data.

4. A method according to claim 3 in which the critical points are precalculated.

5. A method according to claim 4 in which, when the step of choosing encoder settings results in settings that are the same as the previous such choice, the precalculated critical points are used, and when the step of choosing encoder settings results, for at least one stream, in a setting different from the previous such choice for that stream, the critical points for that stream or streams arc calculated afresh.

6. A method according to claim 1 in which the choice of encoder settings is such that the picture quality of each stream shall be substantially the same.

* * * * *